Sept. 21, 1954

C. L. SCHEBLER 2,689,623

APPARATUS FOR SEPARATING LIQUID ENTRAINED
OR CARRIED BY A GAS OR VAPOR

Filed May 28, 1952

INVENTOR.
Carl L. Schebler

BY
*Lamphere and Van Valkenburgh*

ATTORNEYS

Sept. 21, 1954    C. L. SCHEBLER    2,689,623
APPARATUS FOR SEPARATING LIQUID ENTRAINED
OR CARRIED BY A GAS OR VAPOR
Filed May 28, 1952    2 Sheets-Sheet 2

*INVENTOR.*
Carl L. Schebler
BY
ATTORNEYS

Patented Sept. 21, 1954

2,689,623

UNITED STATES PATENT OFFICE 2,689,623

APPARATUS FOR SEPARATING LIQUID ENTRAINED OR CARRIED BY A GAS OR VAPOR

Carl L. Schebler, Denver, Colo.

Application May 28, 1952, Serial No. 290,516

11 Claims. (Cl. 183—92)

This invention relates to apparatus for separating a liquid entrained or carried by a gas or vapor, and more particularly to a separator adapted to separate a liquid such as oil from a refrigerant gas or the like. The liquid to be separated may be in the form of relatively large drops or droplets, or in the form of relatively small droplets, such as a spray or mist. Also, the gas or vapor which carries the liquid is not necessarily completely in the gaseous state, but may consist in part of a mist or fog. This application is a continuation-in-part of my copending application Serial No. 132,449, filed December 12, 1949, entitled "Apparatus for Separating Liquid Entrained or Carried by a Gas or Vapor" and now abandoned.

In refrigerating equipment, a refrigerant gas, such as sulphur dioxide, dichloro-diffuoro methane or the like, is usually compressed in a compressor, which may be a positive displacement or piston type or a rotary type, such as axial flow, radial flow, centrifugal, etc. After compression, the refrigerant gas is passed through a condenser, to reduce the temperature of the compressed gas, which has become heated during compression and also to cause the refrigerant gas to liquefy, since the temperature at which the liquid state will exist normally increases with pressure. The liquefied gas is then passed through an expansion orifice in an evaporator, at which point the change of the refrigerant from a liquid to a gaseous state, with a consequent necessity for supplying the latent heat of evaporation, causes heat to be extracted from the area surrounding the expansion orifice and the temperature of the gas itself to be reduced. The refrigerating effect so produced may be utilized in cooling heat transfer surfaces directly, or in cooling a heat transfer liquid, such as brine, which may then be circulated through heat transfer units. From the evaporator, the cold gas passes to a receiver, or directly to the suction intake of the compressor. Since compressors involve reciprocating or rotating parts, and sometimes also sliding or other relatively movable surfaces, it is necessary to supply oil for lubrication. This oil tends to be picked up by the refrigerating gas, and to be carried over into the cooler, and later into the receiver, evaporator, etc. Needless to say, an undue accumulation of oil reduces the capacity of the unit, and also tends to interfere with the operation of parts such as the expansion valve, storage float control, and others. Generally, the oil is not absorbed by the refrigerant when in the gaseous state, but is merely carried by the gas in the form of drops or droplets, the size being dependent upon operating and flow or other conditions. However, when the refrigerant gas is liquefied, the liquid has a tendency to absorb any oil present, and the oil is therefore carried through the expansion valve, but does not react in the same way as a refrigerant when going through the expansion valve, thus producing difficulties in operation at this point. In addition, when the gas reaches the evaporator, the oil may tend to drop out and collect at low points, thereby interfering, sometimes seriously, with the adequate transfer of heat to the cold gas due to the relatively low thermal conductivity of oil.

In certain oil refinery operations, it is desired to remove liquids from gases, and many of the problems there encountered are similar to problems encountered in connection with refrigeration equipment.

Among the objects of the present invention are to provide novel apparatus for separating liquid from gas; to provide such apparatus which is particularly useful in separating oil or the like from a refrigerant or other gas; to provide such apparatus which has a relatively high separation efficiency; to provide such apparatus which may be made in different sizes and capacities; to provide such apparatus which adequately separates and collects a liquid such as oil, which may be returned to a desired point of reuse; to provide such apparatus which does not involve moving parts for separation; and to provide such apparatus which is economical to manufacture and to operate. Additional objects and the novel features of this invention will become apparent from the description which follows, taken in connection with the accompanying drawings, in which:

Figure 1:
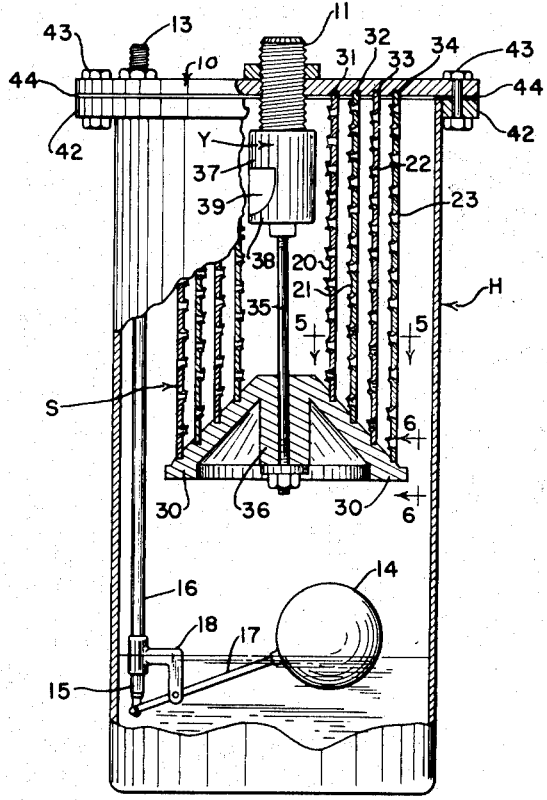
Fig. 1 is a side elevation, partly broken away and shown in vertical section, of apparatus constructed in accordance with this invention.
Figure 2:
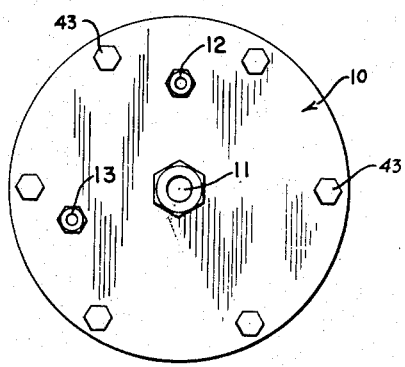
Fig. 2 is a top plan view of the apparatus of Fig. 1.

As illustrated in Fig. 1, apparatus for separating liquid from gas and constructed in accordance with this invention, may comprise a liquid separator S installed within the upper portion of a container or housing H, closed by a top 10, to the underside of which the separator S may be attached. The top 10, as in Fig. 2, may be provided with an inlet connection 11 for gas or vapor which is carrying the liquid to be removed; an outlet connection 12 for the gas or vapor; and an outlet connection 13 for the removed liquid. In the case of apparatus for removing oil from a refrigerant gas, the refrigerant gas will, of course, pass into the separator S through inlet 11, the refrigerant gas from which oil has been removed will be discharged through outlet 12, while the collected oil may be discharged through liquid outlet 13. The oil removed or stripped from the gas by the separator S falls into the lower portion of the container H, the oil level being maintained at or below a predetermined level by a float 14 which controls an oil discharge valve 15 mounted at the lower end of a tube 16 which leads to oil discharge connection 13. The float 14 is mounted on a rod 17 which is pivoted on a bracket 18 so that upward and downward movements of the float will open or close the valve 15. In general, the pressure within the housing H may be maintained sufficiently high as by installation in the compressor discharge line, so that the oil will be automatically discharged upon opening of the valve, or suitable suction, as by a pump (not shown), may be utilized to withdraw the oil or separated liquid.

In accordance with the present invention, the separator S comprises one or more separating members, such as a partition, but preferably a series of spaced separating members, each of which is provided with a series of small holes having a jagged projecting edge which faces in the direction of gas flow. Such separating members may be exemplified by the set of nested cylinders 20, 21, 22 and 23, respectively, of Fig. 1, the flow of gas being from inlet 11 to the center of the cylinders and out through the cylinders. As in the case of cylinder 23, also shown in Fig. 3, each of the cylinders has a series of holes 24, disposed in spaced relation to each other, while, as in Figs. 4 and 5, each of the holes 24 is provided with a jagged projecting edge 25 extending in the direction of gas flow, i. e. to the inside in the case of cylinders 20—23. Edge 25 is preferably jagged, having one or more sharp projecting portions 26, so that gas in passing through the hole 24 will tend to be more readily stripped of liquid. Also, as in Fig. 5, the cylinders are so spaced that the holes in one member will not register with the holes in a preceding or succeeding member, the spacing being both axial and circumferential in the case of cylindrical members. Thus, direct flow is prevented and the gas is forced to follow a circuitous path through the members. Normally, each member is provided with the same number of holes, since the amount of gas passing therethrough is the same, and the holes 24, of the outer cylinder 23, as in Fig. 5, will be spaced further apart circumferentially than the holes of the other cylinders, and so on for each cylinder of lesser diameter. This alternate spacing of the holes further tends to force the gas into contact with the projecting edges 25 substantially from the side, thereby assisting in the removal of the liquid from the gas. In addition, the gas is given a swirling motion as it enters the interior of the nest of cylinders, as described later, so that the gas will tend to flow past the jagged projecting edges of the holes from the side, rather than entering the holes directly, thus enhancing the "wiping" action of the jagged edges 24.

Figure 3:
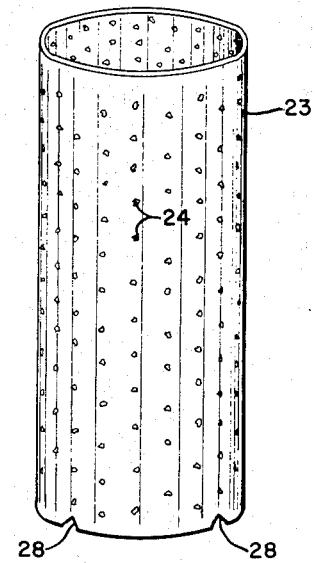
Fig. 3 is an enlarged, three dimensional view of an oil separating cylinder forming a part of the apparatus of Fig. 1.
Figure 6:
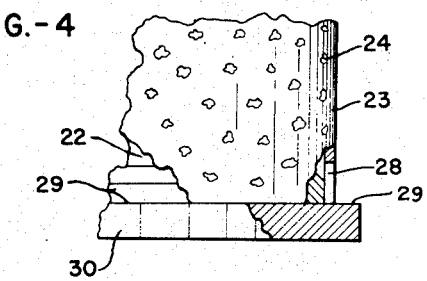
Fig. 6 is an enlarged fragmentary side view, partly broken away to show certain parts in section, taken from the position of line 6—6 of Fig. 1.

As the drops or droplets of liquid collect on the edges 25 of the holes 24, the liquid will run down the inside of each of the cylinders 20 to 23, inclusive, to the bottom thereof, and the lower end of each cylinder may be provided with one or more slots 28, such as three, as in Figs. 3 and 6, for drainage of the liquid to the lower portion of housing H. Slots 28 may be triangular in shape and may vary in number, depending upon the amount of oil or liquid to be removed, and the consequent necessary cross sectional area for flow of the liquid through the slots. The lower ends of the cylinders may be at the same level, although to facilitate the drainage of oil, the lower ends of the cylinders are preferably placed at increasingly lower levels from the inside out, as shown in Fig. 1. Also, the lower ends of the cylinders may abut against a series of annular steps 29, formed on the outside of a conical support 30. If desired, the steps 29 may be sufficiently deep and the respective cylinders of a diameter corresponding to the inner edge of the corresponding step, so that each cylinder will fit relatively snugly over the inner edge of the respective step and only a portion of each slot 28 will be open. Of course, any or all of the cylinders may be spaced outwardly from the inner edge of the step, in which case a greater portion of the area of the slots will be available for oil flow, although a comparatively close fit between a cylinder and the inner edge of a step tends to maintain accurate spacing and positioning of the parts. Or, the oil or liquid may be drained through holes punched or otherwise made at or just above the inner edge of the steps.

Figure 7:
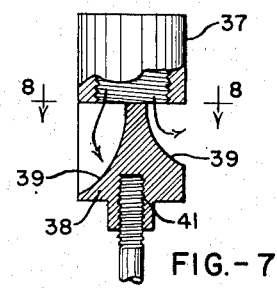
Fig. 7 is an enlarged fragmentary section, taken along line 7—7 of Fig. 1, illustrating a special connection of the apparatus of Fig. 1.

The upper end of each of the cylinders 20–23, inclusive, for sealing, clamping and positioning purposes, may respectively engage each of a series of annular seats or grooves 31 to 34, inclusive, which may be machined or otherwise produced on the underside of top 10, preferably coaxial with the gas inlet. In case the top 10 is cast of metal or made of plastic, the seats or grooves 31 to 34, inclusive, may be formed by molding. The series of cylinders 20–23, inclusive, is preferably mounted coaxially with the gas inlet 11, and may be clamped between the conical support 30 and the housing top 10 by a bolt or stud 35, or any other suitable tightening device, the support 30 being provided with suitable means, such as a cross flange 36 on the underside to receive the bolt. To connect the bolt 35 to the inlet 11, and also produce a swirling motion of the entering gas, a special connection or yoke Y, shown also in Figs. 7 and 8, may be utilized. Yoke Y may comprise a cylindrical barrel 37 interiorly threaded for engagement with the exterior threads of inlet connection 11, and a deflecting head 38 connected at its periphery to the lower end of the barrel 37 and provided with spiral surfaces 39 which extend from a transverse bridge 40 in a direction downwardly and outwardly, so as to produce a swirling effect on the oil-laden gas, as in the direction of the arrows of Fig. 8. As will be evident, the spiral surfaces 39 will tend to cause the gas to rotate within the interior of the inner cylinder 20, so that the gas will tend to move spirally around the inner surface of cylinder 20, and will move in a direction generally across the surface of the inner cylinder. Gas passing through the holes 24 will thus turn at a sharp angle to enter the holes, thereby enhancing the "wiping" effect of the jagged edges 25. In addition, the swirling motion of the gas will tend to distribute the gas to the upper, as well as the lower portion of the inner surface of the cylinder 20.

Head 38 may also be provided at its lower end with a threaded hole 41 to receive the upper end of bolt 35. Preferably, the area of the opening on each side of bridge 40 is sufficiently large to provide a cross sectional area at least equal to that of inlet connection 11, while more than two spiral surfaces 39 may be provided. Of course, the bolt 35 may be connected directly to the top 10, and the inlet connection 11 offset from the center of the nest of cylinders, but the special connection Y permits the size of the cylinders, as well as the total size of the apparatus, to be reduced to a minimum. The space between the outer cylinder 23 and the inside of container H may be only sufficiently wide to accommodate oil tube 16, and permit the adequate passage of gas to gas outlet 12.

The housing H may be provided with a flange 42, such as welded thereto, at its upper end, so that the top 10 may be connected thereto, as by bolts 43, while a gasket 44 may be clamped therebetween to prevent leakage. Of course, other means for holding the housing top and container together may be utilized, such as an annular split clamp having a V-groove on the inside.

The material of which the various parts may be made may, of course, vary quite widely. For the housing and container H, drawn steel may be used, since the container sides and bottom may be formed in one piece. For the top 10, either steel or other metal, or even plastic, may be utilized. In the latter instance, a metal reenforcing and clamping ring may be placed on top of the plastic to distribute the clamping pressure of the bolts more evenly.

Figures 4, 8:
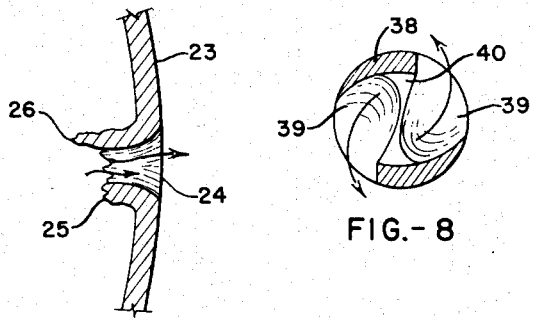
Fig. 4 is an additionally enlarged, fragmentary cross section taken at a hole in the cylinder of Fig. 3.
Fig. 8 is a transverse section taken along line 8—8 of Fig. 7.
Figure 9:
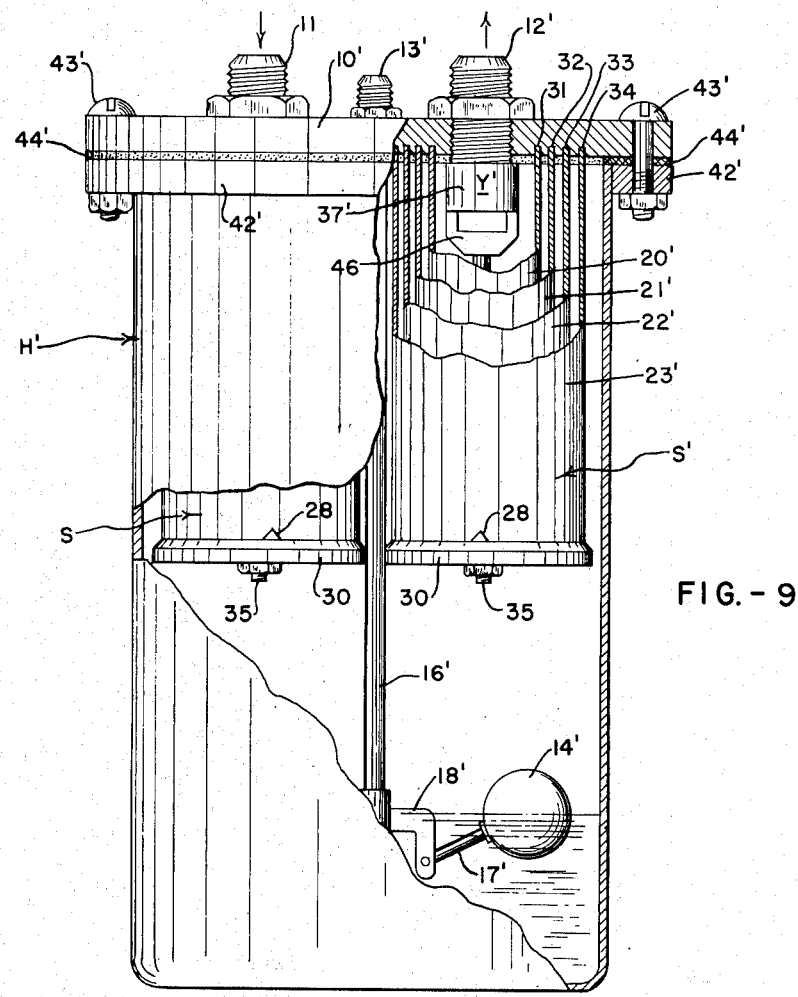
Fig. 9 is a side elevation, with certain parts broken away to illustrate the interior construction more clearly, of an apparatus alternative to that of Fig. 1.
Figure 5:
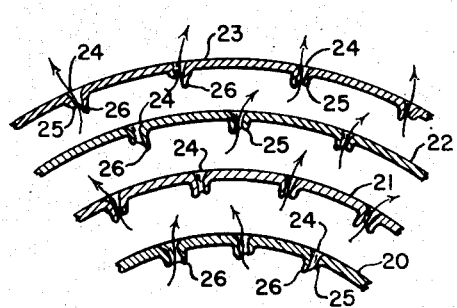
Fig. 5 is a fragmentary horizontal section taken along 5—5 of Fig. 1.

Instead of a single separator S disposed in the housing, the apparatus may include two separators, such as separators S and S' of Fig. 9, separator S removing oil from incoming gas and separator S' oil from the outgoing gas. The construction of separator S of Fig. 8 is similar to that of Fig. 1, the cylinders 20–23, inclusive, having holes provided with jagged projecting edges facing to the inside, i. e. in the direction of flow from inlet 11 and then through the respective cylinders 20–23, inclusive. Similarly, the upper ends of the cylinders may engage annular seats or grooves in top 10', which closes a larger housing H', which may be cylindrical or oval in shape so as to accommodate the separators S and S'. Similarly, top 10' may be attached to housing H by cap screws 43' which clamp a gasket 44' against a flange 40' of the housing H'. The lower portion of the housing H', as before, may act as an oil chamber, the level of oil being regulated by a float 14' pivoted by a rod 17' on a bracket 18', and similarly controlling a valve mounted on the lower end of a tube 16' which extends upwardly to an oil outlet 13'.

The cylinders of separators S and S' are similar, except that the holes in the nested cylinders 20' to 23' of separator S' have projecting edges which face outwardly, i. e. opposite to the relative direction shown in Fig. 4, with respect to the curvature of the cylinder. However, the jagged edges of the holes in the cylinders of separator S face in the direction of gas flow, so that the gas in passing through the cylinders tends to be stripped of the oil or liquid carried thereby. The gas flow in separator S, of course, is from the inside to the outside, whereas the gas flow in the case of separator S' is from the outside to the inside, for discharge through gas outlet 12'. Due to the proximity of separators S and S', there should be relatively little gas circulation to the oil collected in the lower portion of housing H', the gas flow being primarily directly from separators S to S'. The bolt 35 and lower support 30 for the cylinders of separator S', as well as the two sets of annular grooves 29 to 32, inclusive, may be identical with the same parts of separator S. Also, the oil drainage grooves 28 in the lower ends of the cylinders may be the same, or drainage grooves may be cut in steps 29 of support 30 for either separator, or in the embodiment of Fig. 1. Since the gas flows inwardly through the cylinders 20' to 23' of separator S', the yoke Y' may be somewhat simpler in construction than the yoke Y, such as including a cylindrical barrel 37' interiorly threaded for engagement with the exterior threads of outlet connection 12', and a bridge 46 which extends across the bottom of the yoke in spaced relation to the barrel and is also provided with a threaded hole to receive the upper end of bolt 35. As before, the area of the opening on each side of bridge 46 is sufficiently large to provide a cross sectional area at least equal to that of outlet connection 12'.

It will be understood that various changes may be made in the materials and manner of construction. Thus, the yoke Y' of Fig. 9 may be substituted for the yoke Y of Fig. 1, or for the yoke of the separator S of Fig. 9. The cylinders may have shapes other than circular, and the jagged edged holes may be produced in any suitable manner, such as a multi-cornered punch. A swirling motion may be imparted to the gas entering the inner cylinder by baffles or other surfaces formed differently from surfaces 39 but adapted to produce an equivalent result. Thus, a swirling motion may be imparted by a spiral baffle mounted within the inner cylinder or mounted on rod 35, by an otherwise closed or substantially closed head having discharge holes inclined to the axis of the cylinders, or by other deflecting means.

From the foregoing, it will be evident that the apparatus of this invention fulfills to a marked degree the requirements and objects hereinbefore set forth. The use of relatively solid members having holes which are provided with ragged projecting edges, facing in the direction of gas flow, are much more effective than screens, for instance, in separating liquid from gas entrained in or carried thereby and more particularly in separating oil from a refrigerant gas. The action of the projecting edges, which are rough and jagged, appear to remove oil drops or droplets before the gas has passed through the hole. In the case of a screen, oil tends to be removed during passage through the holes, but the oil not only tends to clog the holes but also to be pushed through the hole and to be carried on by the gas. Thus, the capacity of a screen for separating oil is quite limited. The ragged projecting edges of the holes in accordance with the present invention cause the oil to be separated on the entering side, so that the gas is free to flow through the hole, and the hole does not tend to become clogged with oil. Thus, the oil will flow down the separating member, and may be collected at the bottom of the members. When the separating members are cylindrical and disposed in nested relation, a considerably smaller size of separator can be built. Also, the gas tends to be distributed more nearly evenly to all of the holes, than in the case of a rectangular plate, for instance. However, such a rectangular plate, when provided with holes having ragged projecting edges facing in the direction of the gas flow, is within the purview of this invention. The swirling motion imparted to the gas by the surfaces 39 of yoke Y tends to increase the amount of liquid removed by the first cylinder; and the more liquid removed by the first screen, the greater opportunity subsequent cylinders have to remove liquid. The preferred staggered relation of the holes increases the "wiping" action of the jagged edges of the holes in subsequent cylinders; and since the first cylinder is the only cylinder of the separator S through which gas tends to flow directly to and through the holes, the surfaces 39 or the equivalent thereof tend to insure a maximum "wiping" action for all hole edges. The swirling action also tends to produce a more uniform distribution of gas around the inner cylinder, particularly to the upper portion thereof, as indicated previously.

The arrangement of a series of slots at the lower end of each of the separating members, either in the members or a support therefor to enable drainage of separated oil or liquid into a collecting chamber, is also advantageous, as is a stepped lower support for the separating members, which permits the oil to flow from member to member and eventually into the collecting chamber. The use of a special yoke connection by which the separating members may be clamped between a support and the housing top, permits the construction to be simplified. Since the separator itself is attached to the top, the top can be removed without disturbing the housing, or the bolts holding the housing and top together can be removed, and the housing slipped downwardly without disturbing any lines which connect the gas or oil connections. By providing annular seats or grooves for the upper ends of the nested cylinders, not only is an adequate seal secured but also the alignment and positioning of the cylinders is maintained. Similarly, by making the inside edge of each step of the lower support correspond to the inside diameter of the corresponding cylinder, more accurate positioning and alignment can be secured. The conical shape of the support, coupled with the steps of increasing diameter against which the successive cylinders bear, tend to maintain the support in alignment and thereby tends to reduce the possibility of off-center stresses.

The nested cylinders may be made of any desired material, such as steel, copper, or brass—preferably material which is readily punched yet will tend to form relatively jagged edges; and is also readily brazed, soldered or welded, since the cylinders are readily made from flat sheet in which holes 24 are punched and the sheet then cut to length, rolled to circular shape and the longitudinal edges brazed, soldered, welded or the like. Of course, the cylinders may be made from tubular stock in which the holes 24 are punched as over a mandrel, and cut to length before or after punching. When the holes are punched inwardly, tubular stock may be found convenient, but when the holes are punched outwardly, as in separator S' of Fig. 9, flat stock may be found to be more convenient. The punches by which the holes are produced may be round adjacent the point, but preferably are multicornered, such as triangular or square, a multicornered shape having been found to tend to produce relatively jagged edges which tend to extend away from the hole on all sides, rather than perhaps on one side only. The oil float, valve and discharge tube may be made of conventional materials, such as brass, while the support 30 for the lower ends of the cylinders may be made of metal, machined or diecast, or of plastic or other suitable material.

Tests of apparatus of this invention, constructed in the manner disclosed in Fig. 9, except that the yoke Y of the separator S was constructed in the same manner as the yoke Y' of separator S', indicated considerable improvement over prior apparatus. The apparatus was connected in the discharge line of a ¼ ton refrigerant compressor connected to a conventional condenser, evaporator, and 30 ft. of ⅜" copper tubing to act as a cooling oil, a conventional thermostatic expansion valve being employed. The oil was colored so as to be readily seen, and the top 10' of the apparatus of this invention was made of transparent plastic, so that the action in the separators S and S' could be viewed. During normal operating conditions, at the start of compression, a slight oil mist appeared within the first two inner cylinders, i. e. cylinders 20 and 21 of the incoming separator S, but this disappeared within a few seconds, and the oil dropped from the support 30 of the incoming separator S, into the lower portion of the housing H, in a steady procession of drops. To concentrate the oil discharge, only one slot 28 was provided in each of the cylinders. During this normal test, it was unnecessary for the outgoing separator S' to remove any oil. A cotton pack, installed in the gas line following the separator, absorbed very little oil, indicating that substantially all oil contained in the refrigerant gas had been removed by the separator.

In a further test, an "abnormal" run was made in which oil was intentionally flushed from the compressor, and the amount of oil removed in the incoming separator S was sufficiently great, so that at times the oil level between the last two cylinders of separator S, i. e. between cylinders 22 and 23, rose to about one-third of the distance from the lower to the upper end of the outer cylinder. Of course, if additional slots 28 had been provided, this removed oil would have more quickly drained away into the lower portion of the housing. However, even with the capacity of the incoming separator S thus impaired, the outgoing separator S' remained substantially dry, except for a slight smudge of oil on the outside, indicating that only the outer cylinder of the separator S was necessary to remove any additional oil. A cotton pack check in the gas discharge line indicated that approximately 95% of the oil was being removed.

For additional comparison purposes, the separators S and S' of the apparatus of Fig. 9 were removed, and to simulate a commercial oil separator of the "Frigidaire" type, a pair of screens, taken from such a commercial type of oil separator, were installed. Each of these screens was about the same length as the separators S and S', but closed at the lower end, one being installed at the gas inlet and the other at the gas outlet. When the modified separator was operated under the normal operating conditions, described previously, in the identical refrigeration circuit, there was always a mist of oil swirling about the two screens. Also, the amount of oil removed was considerably less than that removed by the separator of this invention. That is, only about one drop of oil every three seconds passed from the screens to the lower portion of the housing. Also, the percentage of oil removed was relatively low.

It will thus be evident that the apparatus of this invention is particularly useful in separating oil from a refrigerant gas. However, it will be understood that such apparatus is useful for other purposes, such as separating oil or gasoline from refinery gases.

Although alternative embodiments of this invention have been illustrated and described, it will be understood that other embodiments may exist and various changes made therein, all without departing from the spirit and scope of this invention.

1. Apparatus for separating liquid from gas comprising a container having a top; an inlet connection for gas extending through said top, said top having a series of concentric annular grooves surrounding said inlet; a series of nested cylinders of increasing diameter and disposed axially with respect to said inlet, the upper end of each said cylinder resting in one of said grooves and each said cylinder having a series of holes provided with projecting edges facing inwardly; a support engaging and closing the lower end of each of said cylinders; and clamping means maintaining said support against said cylinders and said cylinders in engagement with said top.

2. Apparatus for separating liquid from gas comprising a container having a top; an inlet connection for gas extending through said top; a series of nested cylinders of increasing diameter and disposed axially with respect to said inlet, each said cylinder having a series of holes provided with projecting edges facing inwardly with the holes in one cylinder being staggered both axially and circumferentially with respect to the holes in adjacent cylinders; a lower support for said cylinders, said support having a generally conical upper surface provided with annular steps, the lower end of each of said cylinders resting on one of said steps; means for draining liquid down said support; and clamping means maintaining said support against said cylinders and said cylinders in engagement with said top.

3. Apparatus for separating liquid from gas comprising a container having a top; an outlet connection for gas extending through said top; a series of nested cylinders of increasing diameter and disposed axially with respect to said outlet, each said cylinder having a series of holes provided with projecting edges facing outwardly with the holes in one cylinder being staggered both axially and circumferentially with respect to the holes in adjacent cylinders; a lower support for said cylinders, said support having a generally conical upper surface provided with steps and the lower end of each of said cylinders resting on one of said steps; means for draining liquid down said support; and clamping means maintaining said support against said cylinders and said cylinders in engagement with said top.

4. Apparatus for separating liquid from gas comprising a container having a top; an inlet connection for gas extending through said top; a series of nested cylinders of increasing diameter and disposed axially with respect to said gas connection, each said cylinder having a series of holes provided with projecting edges facing inwardly; a support for the lower ends of said cylinders; clamping means extending within said cylinders to said support for maintaining said support against said cylinders and said cylinders in engagement with said top; and a yoke connected to said inlet at said top and having a barrel and a transverse bridge providing space for gas flow and a connection point for said clamping means.

5. Apparatus for separating liquid from gas comprising a container having a top; an inlet connection for gas extending through said top; a series of nested cylinders of increasing diameter and disposed axially with respect to said gas connection, each said cylinder having a series of holes provided with projecting edges facing inwardly; a support for the lower ends of said cylinders; clamping means extending within said cylinders to said support for maintaining said support against said cylinders and said cylinders in engagement with said top; and a yoke connected to said inlet at said top and having a barrel and a deflecting head connected to said barrel and provided with spiral surfaces for imparting a swirling motion to gas entering the space within the inner cylinder.

6. Apparatus for separating liquid from gas comprising a container having a top; an inlet connection for gas extending through said top; an outlet connection for gas extending through said top in spaced relation to said inlet connection; two series of nested cylinders of increasing diameter, one series being disposed axially with respect to said inlet and the other with respect to said outlet, each said cylinder having a series of holes provided with projecting edges with the holes in one cylinder being staggered both axially and circumferentially with respect to the holes in adjacent cylinders, the projecting edges of said inlet series of cylinders facing inwardly and the projecting edges of said outlet series of cylinders facing outwardly; a lower support for each series of cylinders, each said support having a generally conical upper surface provided with annular steps, the lower end of each of said cylinders resting on one of said steps; means for draining liquid down along said supports; and clamping means maintaining each of said supports against said cylinders and said cylinders in engagement with said top.

7. Apparatus for separating liquid from gas comprising a container having a top; an inlet connection for gas extending through said top, said top having a series of concentric annular grooves surrounding said inlet; a series of nested cylinders of increasing diameter and disposed axially with respect to said inlet, the upper end of each said cylinder resting in one of said grooves and each said cylinder having a series of holes provided with projecting edges facing inwardly with the holes in one cylinder being staggered both axially and circumferentially with respect to the holes in adjacent cylinders; a lower support for said cylinders, said support having a generally conical upper surface provided with annular steps, the lower end of each of said cylinders resting on one of said steps, the inner edge of said step conforming to the inner diameter of the corresponding cylinder and each said cylinder having at least one slot at the lower end extending above the inner edge of the corresponding step for drainage of separated liquid down said support and into the lower portion of said container; a clamping rod for maintaining said support against said cylinders and said cylinders in engagement with said top; and a yoke connected to said inlet at said top and having a barrel and a transverse bridge providing space for gas flow and a connection point for said rod.

8. Apparatus for separating liquid from gas comprising a container having a top; an inlet connection and an outlet connection for gas extending through said top in spaced relation to each other, said top having a series of concentric annular grooves surrounding each of said inlet and outlet; two series of nested cylinders of increasing diameter, one series being disposed axially with respect to said inlet and the other series similarly disposed with respect to said outlet, the upper end of each said cylinder resting in one of said grooves and each said cylinder having a series of holes provided with projecting edges with the holes in one cylinder being staggered both axially and circumferentially with respect to the holes in adjacent cylinders and the projecting edges of said inlet cylinders facing inwardly and said outlet cylinders facing outwardly; a lower support for each series of said cylinders, each said support having a generally conical upper surface provided with annular steps, the lower end of each of said cylinders resting on one of said steps, the inner edge of said step conforming to the inner diameter of the corresponding cylinder and each said cylinder having at least one slot at the lower end extending above the inner edge of the corresponding step for drainage of separated liquid down said support and into the lower portion of said container; a clamping rod for each said series of cylinders for maintaining said support against said cylinders and said cylinders in engagement with said top; a yoke connected to each of said inlet and outlet and having a barrel and a transverse bridge providing space for gas flow and a connection point for said rod; a discharge connection for liquid extending through said top; a tube extending from said liquid discharge connection to the lower portion of said container; and a float controlled valve at the lower end of said tube.

9. Apparatus for separating liquid from gas comprising a container having a top; an inlet connection and an outlet connection for gas extending through said top in spaced relation to each other, said top having a series of concentric annular grooves surrounding each of said inlet and outlet; two series of nested cylinders of increasing diameter, one series being disposed axially with respect to said inlet and the other series similarly disposed with respect to said outlet, the upper end of each said cylinder resting in one of said grooves and each said cylinder having a series of holes provided with projecting edges with the holes in one cylinder being staggered both axially and circumferentially with respect to the holes in adjacent cylinders and the projecting edges of said inlet cylinders facing inwardly and said outlet cylinders facing outwardly; a lower support for each series of said cylinders, each said support having a generally conical upper surface provided with annular steps, the lower end of each of said cylinders resting on one of said steps, the inner edge of said step conforming to the inner diameter of the corresponding cylinder and each said cylinder having at least one slot at the lower end extending above the inner edge of the corresponding step for drainage of separated liquid down said support and into the lower portion of said container; a clamping rod for each said series of cylinders for maintaining said support against said cylinders and said cylinders in engagement with said top; a yoke connected to said inlet and having a barrel and a deflecting head connected to said barrel and provided with spiral surfaces for imparting a swirling motion to gas entering the space within the inner cylinder; a yoke connected to said outlet and having a barrel and a transverse bridge providing space for gas flow and a connection point for said rod; a discharge connection for liquid extending through said top; a tube extending from said liquid discharge connection to the lower portion of said container; and a float controlled valve at the lower end of said tube.

10. Apparatus for separating liquid from gas comprising a closed cylindrical container having an inlet and outlet for gas; a series of nested cylinders within said container, each being disposed about a vertical axis and having a series of holes therein provided with projecting edges facing inwardly, the holes of one cylinder being staggered with respect to the holes of adjacent cylinders and said inlet leading said gas to the space within the inner cylinder; a support engaging the lower ends of said cylinders, said lower ends being disposed at different levels; means for passing removed liquid along said support from cylinder to cylinder; and means for directing the gas to flow from said inlet in a swirling motion in the space within the inner of said cylinders.

11. Apparatus for separating liquid from gas, as defined in claim 10, wherein said nested cylinders are disposed in the upper portion of said container, and the lower portion of said container forms a space for receiving removed liquid; and means for controlling the flow of removed liquid from said container, separately from said gas.

References Cited in the file of this patent

UNITED STATES PATENTS

| Number | Name | Date |
|---|---|---|
| 381,150 | Lowden | Apr. 17, 1888 |
| 918,897 | Noe | Apr. 20, 1909 |
| 934,727 | Hylander | Sept. 21, 1909 |
| 2,580,317 | Pekar | Dec. 25, 1951 |

FOREIGN PATENTS

| Number | Country | Date |
|---|---|---|
| 291,414 | Great Britain | Sept. 27, 1928 |
| 415,378 | Germany | June 19, 1925 |
| 641,143 | France | Apr. 10, 1928 |